June 2, 1959    R. L. STEVENSON ET AL    2,888,857
APPARATUS FOR PRODUCING OPTICAL EFFECTS
Filed Feb. 24, 1955
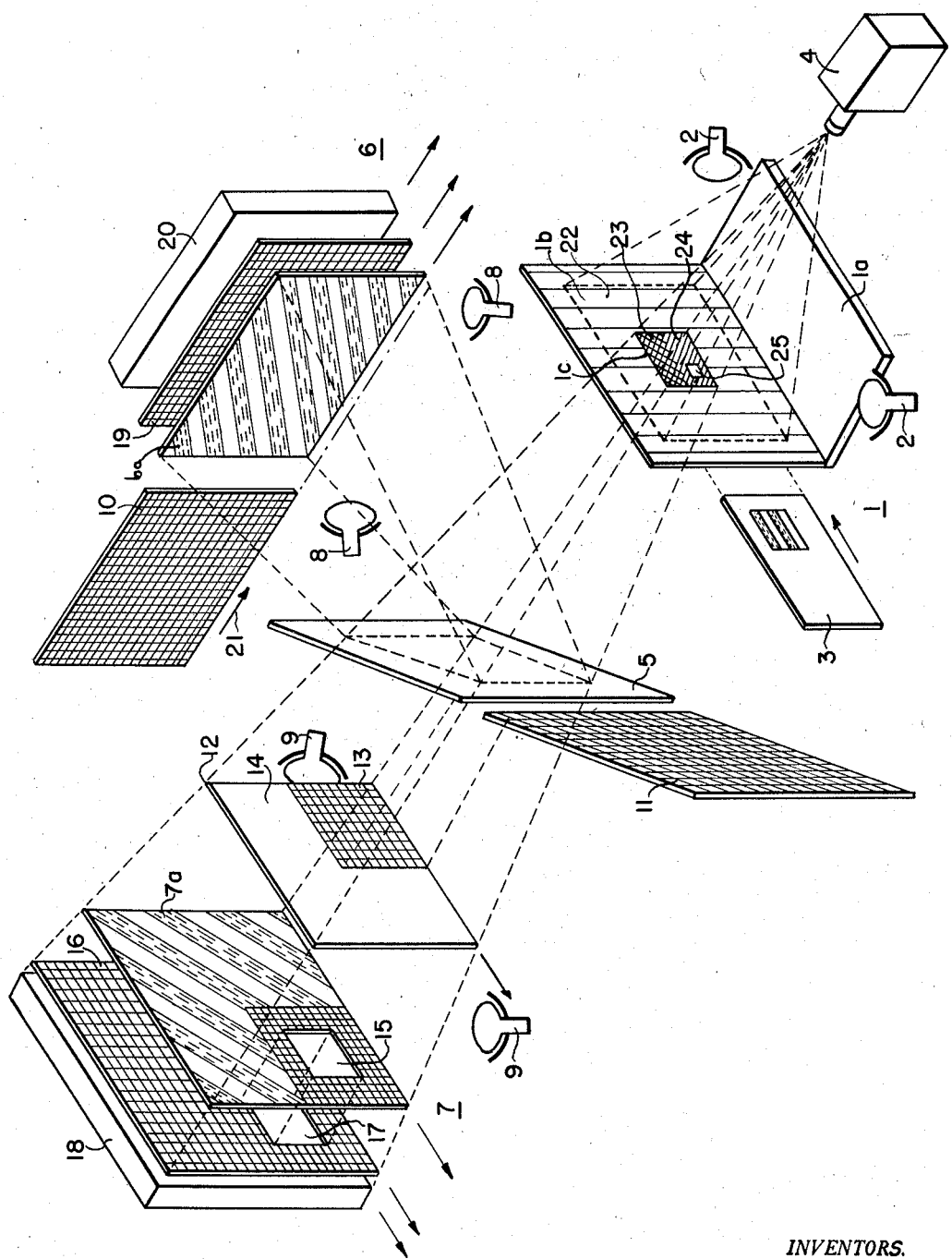
INVENTORS.
Robert L. Stevenson
Peter L.M. Barker
BY Webb, Mackey & Burden
THEIR ATTORNEYS

United States Patent Office 2,888,857
Patented June 2, 1959

2,888,857

APPARATUS FOR PRODUCING OPTICAL EFFECTS

Robert L. Stevenson, Bradfordwoods, and Peter L. M. Barker, Pittsburgh, Pa., assignors to Tix Television Films, Inc., Pittsburgh, Pa., a corporation of Pennsylvania Application February 24, 1955, Serial No. 490,386

4 Claims. (Cl. 88—16)

This invention relates to apparatus for producing television programs, still and motion pictures. It particularly relates to apparatus for producing optical effects for television programs, still pictures and motion pictures. With our invention we produce optical effects described by those skilled in this field as mattes, wipes, dissolves, superimposures and split screen effects.

A matte is a composite or combination scene made from two or more separate scenes in which a portion of one scene is inserted into another scene with the unwanted portion of each original scene matted or completely masked out. A superimposure is a scene which is the result of imposing one scene upon another. The difference between a matte and a superimposure is that a matte is a combination of two separate scenes in which the unwanted portions of the original scenes are matted out and the resulting scene is a combination of only the wanted portions of the two original scenes. On the other hand, a superimposure constitutes a complete scene onto which a second scene, usually regarded as a minor scene, is imposed without eliminating any portion of the two original scenes by mattes or masks.

A wipe is an optical effect produced by erasing one scene or a part thereof while it is being viewed and simultaneously disclosing a second scene or a part of a second scene.

A dissolve is an optical effect which is the result of gradually fading in one scene while simultaneously fading out a second scene wherein both scenes are visible half way through the change in scene. The difference between a wipe and a dissolve is, at no time while a wipe is being effected are both scenes wholly visible as is the case in a dissolve.

A split screen effect is a composite or combination scene made from two separate scenes in which the resulting scene is split into two parts each of which is a portion of one of the original scenes, the unwanted portions of each scene being matted or masked out.

At the present time the production of such optical effects as mattes, dissolves, wipes, superimposures and split screen effects for still or motion pictures requires a minimum of two films which are obtained by one camera making several runs. Another way in which these effects are obtained is to employ two or more cameras operating simultaneously. After completion of two or more films there is considerable work in a photographic laboratory. There the two or more films are combined into a single film by first producing master positive fine grain prints of each original negative and then through the use of an optical printer, stationary or traveling mattes or masks, mirrors and illumination finally photographing a composite negative from the original films.

In the television field to obtain the aforementioned optical effects heretofore has required two or more television cameras, an electronic mixer and in most cases an electronic effects amplifier.

Our invention requires only one camera to produce these optical effects for television programs without an electronic effects amplifier or camera mattes or masks. In addition our invention enables us to make still or motion pictures incorporating these optical effects with one camera and on one film thus avoiding photographing more than one scene or preparing mattes or traveling masks or photographing double exposures. Furthermore, the use of our invention eliminates all or a substantial amount of work in a photographic laboratory with an optical printer in combining two or more separate films into a single one. We can also produce combinations of these optical effects with one camera in television work and with one camera and on one film in still picture and motion picture production. Thus we can produce mattes and wipes; mattes and dissolves; mattes and superimposures; superimposures and dissolves; and superimposures and wipes; split screen effects and superimposures; and split screen effects and mattes.

To achieve these optical effects and combinations thereof we use a mirror and three different sets. Each of the sets may comprise a stage, scenery, backdrops or combinations thereof. The mirror and two of the sets lie in the optical field of a photographic recorder with the third set being outside thereof. The mirror may be either the fully reflective or semitransparent. We prefer the semitransparent type since it gives greater versatility to our invention by permitting the production of more optical effects. By the arrangement of the sets by the control of lights which illuminate each of the sets and by the positioning of masks and the mirror, a photographic recorder views the sets one at a time, simultaneously or in a progressive order.

Specifically we employ a mirror in the optical field of a photographic recorder and positioned in a plane forming an angle with the optical axis of the recorder. Also in the optical field of the recorder are two sets with one of the sets positioned nearer the recorder than the other and being adapted to permit said photographic recorder to view the other set. The mirror is angularly interposed between these two sets and is so positioned that it may be viewed by the recorder. A third set is outside the optical field of the recorder but is positioned so that it can be viewed in the mirror by the recorder. In addition, we employ illuminating means for each of the sets, and movable means for intercepting light rays from said other set and/or the third set. Some of these movable means have parts which permit passage of light therethrough. Sometimes at least one of the sets has a part which permits passage of light therethrough.

In the accompanying drawing we have shown a perspective view of a preferred form of our invention.

Our invention comprises a set 1 illuminated by lights 2 and positioned in the optical field of a camera or photographic recorder 4. The set 1 has a stage 1a and art work 1b. A port 1c in the art work 1b permits the camera to see through to a semitransparent mirror 5. The camera also sees through the semitransparent mirror 5 to set 7 illuminated by lights 9 and sees by reflection in the mirror 5, set 6 illuminated by lights 8. When lights 8 and 9 are turned off, sets 6 and 7 are not seen by the camera.

As pointed out above, each of sets 6 and 7 may comprise a stage, scenery, backdrops or combinations thereof. In addition, each may comprise, in whole or in part, art work, transparencies, still projections, motion picture projections, photographs, cutouts, silhouettes, printed matter, live actors or combinations of the foregoing.

A part of the set 1 is a card 3 which can be readily inserted into port 1c or removed therefrom. Card 3 may contain printed matter, a scene, a part of a scene or a combination of the foregoing. It may also be an opaque mask which is slid into position on the set 1 to conceal a part of the art work and then subsequently removed to reveal a scene, printed matter, or a combination of both.

Also in the optical field of the camera 4 is the semitransparent mirror 5. Mirror 5 is behind set 1 and angularly positioned relative thereto. We locate the mirror so that it can be viewed by the camera 4 through port 1c. This mirror is movable so that we can slide it into and out of the position shown in the drawing. Mirror 5 can be any desired size. For example, it may be large enough to completely reflect all of set 6 and to permit all of set 7 to be viewed therethrough by the camera. On the other hand, it may be smaller than either set 6 or set 7.

To eliminate the effect of refraction we place the reflective coating of the mirror on its front surface.

Positioned behind mirror 5 and also in the optical field of the camera is set 7 having art work 7a. The mirror 5 is positioned angularly relative to the set 7.

Located outside the optical field of the camera is set 6 having art work 6a. We arrange set 6 relative to the mirror 5 so that it can be viewed by the camera 4 in the mirror.

Conventional controls (not shown) enable us to fade in and fade out lights 2, 8 and 9 simultaneously or independently.

Movable masks 10 and 11 permit camera 4 to view all, part, or none of sets 6 and 7 simultaneously or alternatively depending upon their position relative to mirror 5 and sets 6 and 7. When positioned between their respective sets and mirror 5, these masks completely shield each of those sets from the camera 4.

A second movable mask 12 positioned between mirror 5 and set 7 has an opaque part 13 which obscures a section of set 7 and has a transparent or semitransparent part 14 which permits the balance of the set 7 to be viewed by camera 4.

As shown, set 7 has a semitransparent or transparent area 15. Behind this set is a movable opaque mask 16 having a transparent or semitransparent area 17 corresponding to the area 15 of set 7. A source of illumination such as a light box 18 illuminates the semitransparent or transparent areas 15 of set 7 and 17 of mask 16 when mask 16 is between set 7 and the light box.

By removing mask 16 we wipe onto set 7, messages or art work which constitute transparent or semitransparent areas of set 7. With mask 16 in front of light box 18 we wipe onto set 7, messages or art work in area 15 by turning up the lights in light box 18.

With our invention we can animate a set such as set 7 by cutting transparent or semitransparent designs therein. Then by sliding mask 16 back and forth between light box 18 and set 7 we cause the light from the light box to fluctuate over the back of the semitransparent or transparent area of set 7.

A slide (not shown), having a reflective surface and corresponding to light box 18 may be substituted therefor. This slide with its reflective surface will make visible a design cut into either mask 16 or set 7 by reflecting rays from lights 9 back through areas 15 and 17 where the mask and the design or design outline are the same color.

Likewise, behind set 6 is an opaque mask 19 and, to the rear of it, a light box 20. Both the mask 19 and the light box 20 function similarly to the light box 18 and mask 16 behind set 7.

Sets 6 and 7 need not be the same distance from mirror 5. The depth of focus of the camera 4 is the controlling factor. For example, art work may be in close to the mirror, single persons further from the mirror, and groups of people still further therefrom. As the light intensity for these sets is increased, the depth of focus can be correspondingly increased.

As pointed out above, our invention is versatile, in that we produce therewith a number of optical effects requiring for television programs, only one camera and, for still or motion pictures, only one camera and one film. One using our apparatus may view three separate sets, i.e., sets 1, 6 and 7, one at a time, two or three simultaneously, or in a progressive order. Where three separate sets are not required, we obtain substantially the same optical effects by simply eliminating set 1 and placing a camera or photographic recorder in place thereof.

We obtain selective viewing of these sets by control of the lights 2, 8 and 9 and light boxes 18 and 20, by positioning of the mirror and by positioning of the masks. Hereinafter, we have described how we produce the optical effects with our invention.

We produce simple wipes such as a wipe from set 6 to set 7 by first covering set 7 by sliding mask 11 into position behind mirror 5. Then with both lights 8 and 9 turned on we gradually slide mask 11 and mirror 5 out of the optical axis of our apparatus thus revealing set 7 as the reflection of set 6 disappears. After we have changed set 6 we can wipe from set 7 back to set 6 by sliding mirror 5 and mask 11 back into position, thus erasing set 7 as the reflection of set 6 reappears. We also produce a wipe from set 6 to set 7 by first covering set 7 with mask 11, then moving mask 10 in the direction or arrow 21 while simultaneously withdrawing mask 11. To wipe back from set 7 to set 6 we merely move each of the masks simultaneously in the opposite directions.

We effect a simple dissolve from set 6 to set 7 by first positioning mask 11 as shown. Secondly, with lights 8 turned on full and with lights 9 turned out thus showing only set 6, we gradually dim lights 8 while turning up lights 9 as set 6 gradually disappears and set 7 appears. When lights 8 are half faded out and lights 9 half faded in, both sets 6 and 7 are visible. After changing set 6 we can dissolve from set 7 back to set 6 by reversing the operation of the lights. The conventional light control referred to above permits us to simultaneously fade in lights 9, fade out lights 8 and vice versa.

Where sets 6 and 7 are transparencies we produce a dissolve from set 6 to set 7 by dimming the lights in light box 18 while simultaneously turning up the lights in light box 20.

We produce split screen effects by arranging our apparatus for a simple wipe and then by pulling mirror 5 half way out of position so that one-half of set 6 is visible to camera 4 by reflection and one-half of set 7 is visible to camera 4 by direct view. By employing various shapes for masks 10 and 12 we can produce various forms and shapes of split screen effects, i.e., diagonal shaped, circular shaped, crescent shaped, etc.

We produce superimposures in a number of ways. In one way we produce a superimposure of set 6 upon set 7 by positioning mask 11 as shown, thus revealing set 7 while simultaneously masking set 6. Then by removing mask 10 with lights 8 illuminating set 6 we impose that set by reflection over set 7.

A second way to produce a superimposure of set 6 upon set 7 is to again position mask 11 as shown in Figure 1 thus revealing set 7. Next, with mask 10 positioned as shown in Figure 1, we fade in lights 8 thus imposing set 6 upon set 7.

A third way of producing a superimposure of set 6 upon set 7 includes the use of a transparency for set 6 and a gradual fading in of the lights in light box 20 with mask 19 removed from between set 6 and light box 20. This superimposes set 6 upon set 7 by reflection of set 6 over set 7.

The fourth way for making a superimposure comprises interposing mask 19 between a light box 20 and set 6 which in this case is a transparency. Then after turning on light box 20, we gradually remove mask 19 thereby superimposing set 6 over set 7 by reflection of set 6 in the mirror.

A fifth way of producing a superimposure is by the use of cutout patterns and masks which reveal or conceal the cutout portion. Specifically, we first show set 7 with mask 16 covering light box 18 and with light box 18 turned off. Second, we turn on light box 18 thus revealing the cutout pattern of set 7, namely, area 15. This superimposure may be produced by using a completely opaque mask like mask 19 in place of mask 16 and simply removing the opaque mask with light box 18 turned on thereby revealing the cutout pattern of the set.

We produce matte effects by first placing on set 1, art work 1a which has port 1c of any desired shape. With set 1 illuminated by lights 2 we can produce any desired matte within this port by showing therein, sets 6 and/or 7. We can create within this port, any of the aforementioned optical effects such as dissolves, wipes, split screens, superimposures or combinations thereof.

We effect a matte or composite scene of sets 6 and 7 by positioning mask 12 as shown, and by simultaneously illuminating sets 6 and 7. Thus set 7 is viewed directly through mirror 5 and set 6 is reflected onto said mirror. We can change this matte in a number of different ways. For example, we can fade out the lights for one set, remove that set, and insert another set, and then fade in the lights for that set. A second way of changing the matte is to erase set 7 by moving mask 11 into position in front of the set, replace that set with another, and then withdraw the mask. Mask 12 permits us to effect a change in only a part of the matte without affecting the balance of the matte.

Where a composite set or matte requires three different sets we utilize set 1 in addition to sets 6 and 7. When using the three sets the matte may be changed as described above. In addition, sets 6 and 7 may be simultaneously changed, either by masking each set or by simultaneously fading out the lights for sets 6 and 7, changing said sets, and then either unmasking them or fading in the lights therefor. The use of the three sets also permits us to continuously change a matte by using set 1 in combination with one of the sets 6 or 7 to compose a matte, then, during a program, change from one set to another in the ways previously described.

As stated above, our invention products combinations of these optical effects. Specifically, we make a matte and a wipe by first producing a matte of set 6 and set 1 and then by wiping from set 6 to set 7 as described above. The combination of a matte and a dissolve is achieved in substantially the same manner, except that, instead of wiping from set 6 to set 7, we dissolve from set 6 to set 7 as described above.

One way we effect the combination of a matte and a superimposure is to make a superimposure comprising set 6 imposed upon set 7, and then forming a matte comprising that superimposure and set 1.

A combination of a superimposure and a wipe results from first making a superimposure of set 1 upon set 6 and then wiping from set 6 to set 7 in the manner previously described.

We produce a combination of a superimposure and a dissolve by making a superimposure of set 1 upon set 6 and then dissolving from set 6 to set 7 in the manner described above.

A split screen and a wipe result from, first composing a split screen as described and then masking out one set while simultaneously masking in the balance of the other set.

A split screen and a superimposure is produced by composing a split screen and then superimposing upon one or both parts of the split screen a set from set 1.

A combination of a split screen and a matte is substantially the same as that of a split screen and superimposure, except that instead of imposing a set from set 1 we compose a matte of a set on that stage with the split screen.

One example of the many combinations of sets which we produce with our apparatus is the set shown in the drawing viewing set 1 where area 22 is art work 1b; area 23 is a combination of set 6 and set 7; area 24 is set 6; and area 25 is area 15 of set 7. Area 23 results from the projection of strong light from light box 18 through mirror 5 to port 1c. The strong light erases a part of the reflection of set 6 so that only area 15 of set 7 is seen in area 23.

Where the sets or art work on set 1 are at a considerable distance from sets 6 and 7, there is a problem of depth of field. However, we have obtained satisfactory results in both television and motion picture work by properly positioning sets 6 and 7 and by allowing sufficient illumination for those sets so that the camera lens may be "stocked down" to obtain the proper depth of field.

From the foregoing, it is apparent that our invention has important advantages. First, in the production of television programs, our apparatus produces the above described optical effects and combinations thereof, with one camera and without an electronic effects amplifier or camera mattes or masks. Second, in the production of still or motion pictures, we make these optical effects and combinations thereof with one camera and on one film. This avoids the use of photographic laboratory work where separate films must be combined by optical printer and master postive fine grain films into a combined negative to produce the same effects. Thus, our apparatus effects a substantial saving in equipment, material, personnel, and cost of producing TV programs, still and motion pictures. Third, our invention makes these optical effects with sets comprising art work, still projections, motion picture projections, photographs, cutouts, silhouettes, live actors, printed matter and combinations thereof. Hence, it has almost unlimited application to any type of television program, still picture and motion picture.

In the production of television programs our apparatus produces combinations of optical effects which heretofore have been imposible to produce. Specifically, these combinations of optical effects are a wipe and a matte; split screens and a matte; and a matte within a matte. With the exception of superimposures, producers of television programs have heretofore been unable to obtain any of the optical effects discussed above with one camera irrespective whether they employed in addition to one camera, electronic effects amplifiers, camera mattes and/or masks.

While a certain present preferred embodiment of the invention has been shown and described, it will be understood that it may be otherwise embodied within the scope of the appended claims.

We claim:

1. Apparatus for producing optical effects adapted to be viewed by a photographic recorder comprising a semitransparent mirror in the optical field of the recorder and positioned in a plane forming an angle with the optical axis of the recorder, a first set and a second set in the optical field of the recorder, said first set being positioned nearer the recorder than said second set, said semitransparent mirror being angularly interposed between said two sets and being so positioned that it can be viewed by said recorder through said first set, said second set being so positioned relative to said mirror and relative to said first set that it can be viewed by the recorder through the first set and through the semitransparent mirror, the third set out of the optical field of the recorder but positioned so that it can be viewed in the semitransparent mirror by the recorder, at least one of said second set and said third set having at least one part which permits passage of light therethrough, a source of light rays positioned behind said second and/or third set, said rays being adapted to pass through said part of said set and movable means for intercepting said light rays between said source of light rays and said second and/or third set.

2. The apparatus of claim 1 characterized by means for illuminating said sets and means for controlling the illumination of said sets.

3. Apparatus for producing optical effects adapted to be viewed by a photographic recorder comprising a semitransparent mirror in the optical field of the recorder and positioned in a plane forming an angle with the optical axis of the recorder, a first set and a second set in the optical field of the recorder, said first set being positioned nearer the recorder than said second set, said semitransparent mirror being angularly interposed between said two sets and being so positioned that it can be viewed by said recorder through said first set, said second set being so positioned relative to said mirror and relative to said first set that it can be viewed by the recorder through the first set and through the semitransparent mirror, a third set out of the optical field of the recorder but positioned so that it can be viewed in the semitransparent mirror by the recorder, at least one of said second set and said third set having at least one part which permits passage of light therethrough, a source of light rays positioned behind said second and/or third set, said rays being adapted to pass through said part of said set, movable means for intercepting said light rays between said source of light rays and said set, and second movable means between said semitransparent mirror and at least one of said second set and said third set for intercepting light rays directed from said sets to said semitransparent mirror.

4. The apparatus of claim 3 characterized by means for illuminating said sets and means for controlling the illumination of said sets.

References Cited in the file of this patent

UNITED STATES PATENTS

| | | |
|---|---|---|
| 1,278,117 | Dawley | Sept. 10, 1918 |
| 1,418,033 | Sutcliffe | May 30, 1922 |
| 1,438,906 | Douglass | Dec. 12, 1922 |
| 1,477,999 | Douglass | Dec. 18, 1923 |
| 1,504,328 | Douglass | Aug. 12, 1924 |
| 1,606,482 | Schufftan | Nov. 9, 1926 |
| 1,669,407 | Artigue | May 15, 1928 |
| 1,959,498 | Planskoy | May 22, 1934 |
| 2,071,044 | Savage | Feb. 16, 1937 |
| 2,281,033 | Garity | Apr. 28, 1942 |
| 2,558,243 | Gibbons | June 26, 1951 |
| 2,697,379 | Walker | Dec. 21, 1954 |
| 2,730,565 | Owens | Jan. 10, 1956 |
| 2,745,901 | Owens | May 15, 1956 |